(No Model.)

J. A. NEICHTER.
FRUIT JUICE EXTRACTOR.

No. 397,467. Patented Feb. 5, 1889.

Witnesses:
F. H. Stuart,
C. E. Humphrey.

Inventor:
John A. Neichter,
by C. P. Humphrey
Atty.

UNITED STATES PATENT OFFICE.

JOHN A. NEICHTER, OF AKRON, OHIO, ASSIGNOR OF TWO-THIRDS TO HARRY E. LOOMIS AND LEWIS D. SEWARD, BOTH OF SAME PLACE.

FRUIT-JUICE EXTRACTOR.

SPECIFICATION forming part of Letters Patent No. 397,467, dated February 5, 1889.

Application filed June 9, 1888. Serial No. 276,607. (No model.)

*To all whom it may concern:*

Be it known that I, JOHN A. NEICHTER, a citizen of the United States, residing at Akron, in the county of Summit and State of Ohio, have invented a certain new and useful Fruit-Juice Extractor, of which the following is a specification.

The object of my invention is to produce a simple and effective device for readily and completely extracting juice from fruits by breaking their cellular structure, and it is especially adapted to extracting the juice of lemons for lemonade.

It consists of the devices illustrated in the accompanying drawings, as hereinafter described and claimed.

Figure 1:
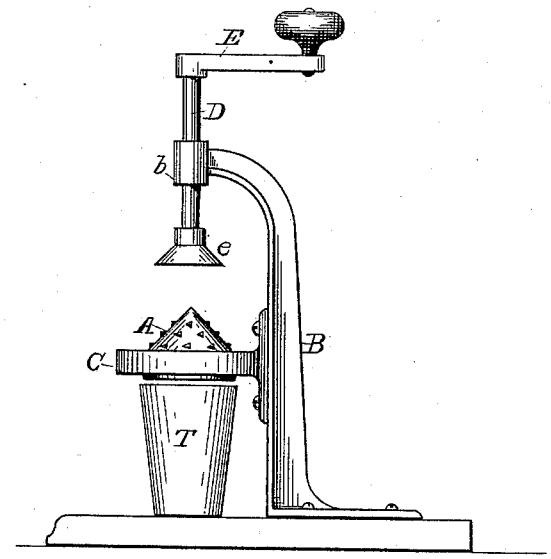
Figure 2:
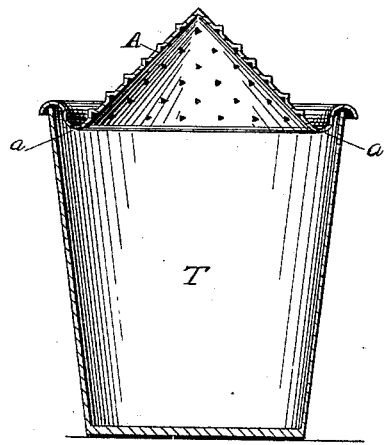

In the accompanying drawings, in which similar reference-letters indicate like parts, Figure 1 is an elevation of my improved juice-extractor adapted for counter use, and Fig. 2 a central vertical section of the conical grater adapted to be placed on a tumbler.

The principal feature of my invention consists of a cone, A, of sheet metal—as tin-plate—perforated with series of holes punched from within, leaving projecting edges constituting a grating or cutting surface. Preferably these perforations are so made as to form semi-pyramidal projections on the face of the cone open at the base, as shown in Fig. 2. At the base of the cone the sheet turns upward, forming an annular channel, in which juice flowing down the outside of the cone collects, and in the bottom of which are holes $a$, through which the juice escapes.

For use on a table or counter this cone is arranged to rest in a ring, C, attached to a standard, B, the latter having a curved top provided with a bearing, $b$, in which is shaft D, free to revolve and slide therein. On the bottom of this shaft is a conical cup, $e$, and on the top a crank, E, by which it is turned.

In operation a half-lemon is placed with its cut face on the apex of the cone A. The cup $e$ is brought down on it and pressed and turned by the crank E, whereby the half-lemon is revolved on the cone A and its cellular structure broken by the grating-surface, thereby permitting the juice to escape into the tumbler T beneath. For ordinary use the connected parts shown in Fig. 1 are omitted, and the cone A is placed on a tumbler, T, as shown in Fig. 2, in which case its outer rim rests on the tumbler's edge, and may be turned down, as shown, to avoid displacement. When thus used, the fruit is applied and turned by hand, the juice flowing into the tumbler T through the holes $a$.

I claim as my invention—

The combination, with the perforated cone A, of the standard B, the ring C, attached to the standard, and the shaft D, journaled in said standard and provided with cup $e$ and crank E, substantially as described.

In testimony that I claim the above I hereunto set my hand.

JOHN A. NEICHTER.

In presence of—
C. P. HUMPHREY,
E. W. STUART.